(12) United States Patent
Krovvidi (10) Patent No.: US 12,120,164 B2
(45) Date of Patent: Oct. 15, 2024

(54) APPARATUS, SYSTEM AND METHOD OF COMMUNICATING AUDIO TRAFFIC OVER A BLUETOOTH LINK

(71) Applicant: INTEL CORPORATION, Santa Clara, CA (US)

(72) Inventor: Srinivas Krovvidi, Telengana (IN)

(73) Assignee: INTEL CORPORATION, Santa Clara, CA (US)

( * ) Notice: Subject to any disclaimer, the term of this patent is extended or adjusted under 35 U.S.C. 154(b) by 781 days.

(21) Appl. No.: 17/132,161

(22) Filed: Dec. 23, 2020

(65) Prior Publication Data

US 2021/0168187 A1 Jun. 3, 2021

(51) Int. Cl.
| | |
|---|---|
| *H04B 7/00* | (2006.01) |
| *G10L 19/16* | (2013.01) |
| *H04L 65/61* | (2022.01) |
| *H04L 65/70* | (2022.01) |
| *H04W 4/80* | (2018.01) |

(52) U.S. Cl.
CPC ............ *H04L 65/70* (2022.05); *G10L 19/167* (2013.01); *H04L 65/61* (2022.05); *H04W 4/80* (2018.02)

(58) Field of Classification Search
CPC ..... H04L 65/70; H04L 65/61; H04L 65/1069; H04L 65/80; H04W 4/80; G10L 19/167
See application file for complete search history.

(56) References Cited

U.S. PATENT DOCUMENTS

| | | | |
|---|---|---|---|
| 10,200,843 B1 * | 2/2019 | Chen ..................... H04W 76/14 |
| 10,271,294 B2 * | 4/2019 | Yamada ............ H04W 56/0045 |
| 10,705,793 B1 * | 7/2020 | Young ..................... G10L 15/22 |
| 10,771,294 B1 * | 9/2020 | Bhat Noojady Krishna ............... H04L 65/70 |
| 2006/0205449 A1 * | 9/2006 | Hillyard ................ H04W 84/18 455/575.2 |
| 2008/0279138 A1 * | 11/2008 | Gonikberg ............ H04W 88/06 370/328 |
| 2008/0287063 A1 * | 11/2008 | Kidron .................. G10L 19/167 455/41.2 |
| 2008/0311852 A1 * | 12/2008 | Hansen ................. H04W 88/06 455/41.2 |
| 2010/0178870 A1 * | 7/2010 | Choi .................... H04B 17/318 455/67.11 |
| 2010/0191536 A1 * | 7/2010 | Sampat ................ H04R 1/1083 704/500 |
| 2010/0273417 A1 * | 10/2010 | Tian .................... H04M 1/6066 455/41.2 |
| 2013/0182798 A1 * | 7/2013 | Lozano ............... H04L 65/1089 375/340 |
| 2016/0277522 A1 * | 9/2016 | Singh ..................... H04W 4/80 |

(Continued)

OTHER PUBLICATIONS

Bluetooth Core Specification V 5.0, Dec. 6, 2016, 2822 pages.

*Primary Examiner* — Stephen M D Agosta (74) *Attorney, Agent, or Firm* — Shichrur & Co.

(57) ABSTRACT

An apparatus may be configured to cause an audio source device to transmit an audio stream over a Bluetooth (BT) wireless communication link, the audio stream configured according to a first Advanced Audio Distribution Profile (A2DP) encoding/decoding (codec) scheme; to monitor a link-condition parameter corresponding to a link condition of the BT wireless communication link; and, based on the link-condition parameter, to reconfigure the audio stream according to a second A2DP codec scheme.

22 Claims, 5 Drawing Sheets

(56) References Cited

U.S. PATENT DOCUMENTS

| | | | |
|---|---|---|---|
| 2018/0116003 A1* | 4/2018 | Gu | H04W 4/70 |
| 2019/0373032 A1* | 12/2019 | Kumar | H04L 47/25 |
| 2019/0386768 A1* | 12/2019 | Shimoji | H04W 24/08 |
| 2020/0015308 A1* | 1/2020 | Takayama | H04M 1/6041 |
| 2020/0044769 A1* | 2/2020 | Neelisetty | H04W 4/80 |
| 2022/0191615 A1* | 6/2022 | Goupy | H04W 4/029 |

* cited by examiner

APPARATUS, SYSTEM AND METHOD OF COMMUNICATING AUDIO TRAFFIC OVER A BLUETOOTH LINK

TECHNICAL FIELD

Aspects described herein generally relate to communicating audio traffic over a Bluetooth link.

BACKGROUND

In the current world, with more and more wireless devices coming into play, wireless audio streaming to multiple speakers in a home theater system is a common use case.

An audio source device, e.g., a Smartphone, or a laptop, may be connected to, and/or paired with, an audio sink device, e.g., a headset, a wireless earphone, or a speaker, for example, to stream sound between the audio source device and the audio sink device via a Bluetooth link.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some aspects may be used in conjunction with various devices and systems, for example, a User Equipment (UE), a Bluetooth (BT) device, a Bluetooth Low Energy (BLE) device, an audio device, a video device, an audio (A/V) device, a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may be used in conjunction with devices and/or networks operating in accordance with existing Bluetooth standards ("the Bluetooth standards"), e.g., including *Bluetooth Core Specification V 5.0, Dec. 6, 2016,* and/or future versions and/or derivatives thereof, devices and/or networks operating in accordance with existing IEEE 802.11 standards (including IEEE 802.11-2016 (*IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016*)) and/or future versions and/or derivatives thereof, devices and/or networks operating in accordance with existing WFA Peer-to-Peer (P2P) specifications (*WiFi P2P technical specification, version 1.7, Jul. 6, 2016*) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some aspects may be used in conjunction with one way and/or two-way radio communication systems, a Bluetooth system, a BLE system, an audio system, a video system, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some aspects may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), Extended GPRS, Code-Division Multiple Access (CDMA), Wideband CDMA (WCDMA), CDMA 2000, single-carrier CDMA, multi-carrier CDMA, Multi-Carrier Modulation (MCM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE Advanced, Enhanced Data rates for GSM Evolution (EDGE), or the like. Other aspects may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that is integrated with a computer, or a peripheral that is attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN and the like.

Some demonstrative aspects may be used in conjunction with a wireless communication network communicating over a frequency band of 2.4 GHz, 5 GHz, or 6 GHz. However, other aspects may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

Some demonstrative aspects are described herein with respect to BT communication, e.g., according to a BT protocol and/or a BLE protocol. However, other aspects may be implemented with respect to any other communication scheme, network, standard and/or protocol.

Figure 1:
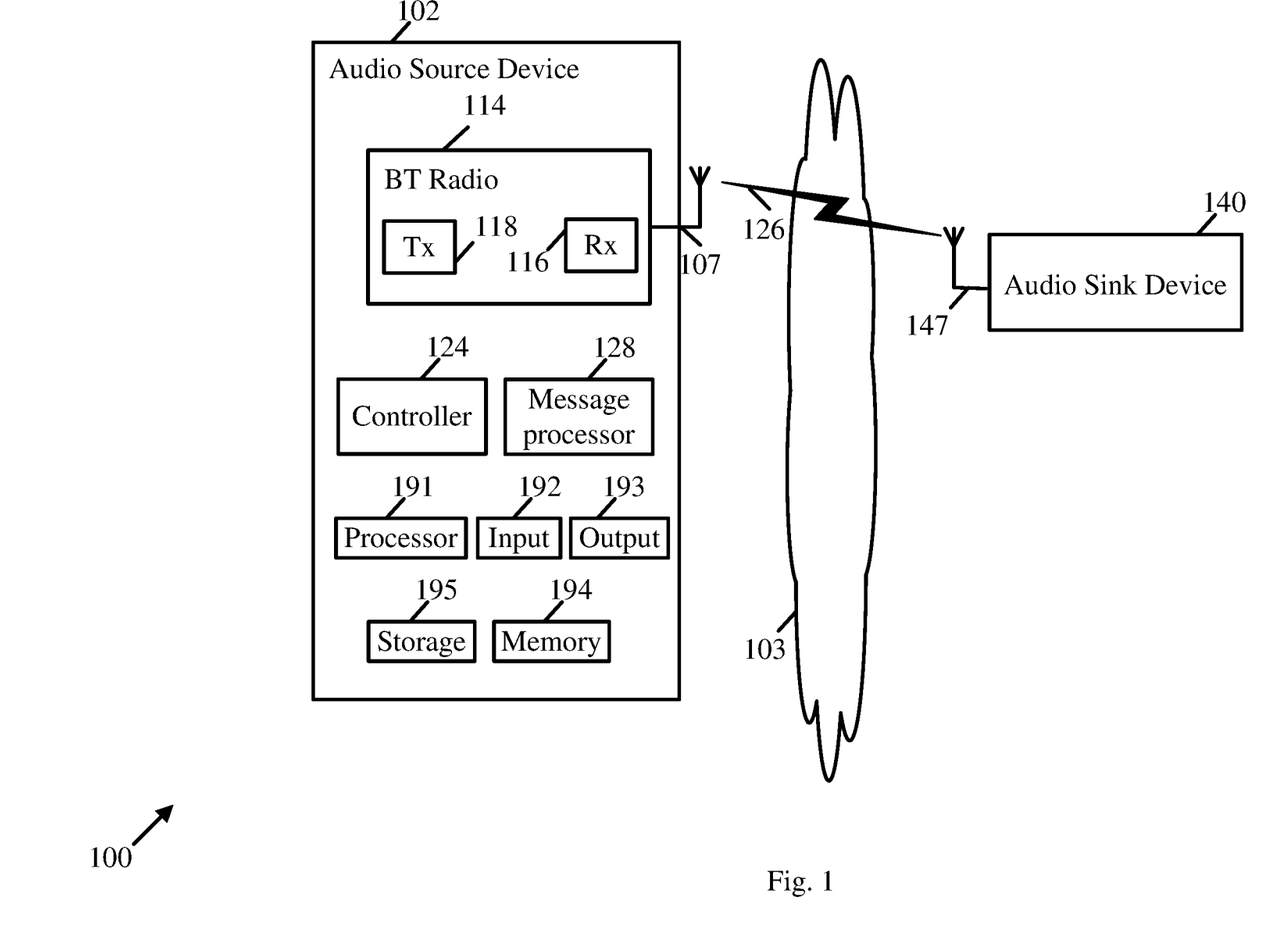
FIG. 1 is a schematic block diagram illustration of a system, in accordance with some demonstrative aspects.

Reference is now made to FIG. 1, which schematically illustrates a block diagram of a system 100, in accordance with some demonstrative aspects.

As shown in FIG. 1, in some demonstrative aspects system 100 may include a wireless communication network including one or more wireless communication devices, e.g., including wireless communication devices 102 and/or 140.

In some demonstrative aspects, wireless communication device 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smart-phone, a television, a music player, or the like.

In some demonstrative aspects, devices 102 and/or 140 may include, operate as, and/or perform the functionality of one or more STAs. For example, device 102 may include at least one STA, and/or device 140 may include at least one STA.

In some demonstrative aspects, devices 102 and/or 140 may include, operate as, and/or perform the functionality of one or more BT devices.

In some demonstrative aspects, devices 102 and/or 140 may include, operate as, and/or perform the functionality of one or more WLAN STAs.

In some demonstrative aspects, devices 102 and/or 140 may include, operate as, and/or perform the functionality of one or more Wi-Fi STAs.

In one example, a station (STA) may include a logical entity that is a singly addressable instance of a medium access control (MAC) and physical layer (PHY) interface to the wireless medium (WM). The STA may perform any other additional or alternative functionality.

In some demonstrative aspects, device 102 may include, for example, one or more of a processor 191, an input unit 192, an output unit 193, a memory unit 194, and/or a storage unit 195. Device 102 may optionally include other suitable hardware components and/or software components. In some demonstrative aspects, some or all of the components of device 102 may be enclosed in a common housing or packaging, and may be interconnected or operably associated using one or more wired or wireless links. In other aspects, components of device 102 may be distributed among multiple or separate devices.

In some demonstrative aspects, processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications.

In some demonstrative aspects, input unit 192 may include, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative aspects, memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102.

In some demonstrative aspects, wireless communication devices 102 and/or 140 may be capable of communicating content, data, information and/or signals via a wireless medium (WM) 103.

In some demonstrative aspects, wireless medium 103 may include, for example, a radio channel, a BT channel, a cellular channel, a Global Navigation Satellite System (GNSS) Channel, an RF channel, a WiFi channel, an IR channel, and the like.

In some demonstrative aspects, wireless communication medium 103 may include a 2.4 GHz frequency band, and/or one or more other wireless communication frequency bands, for example, a 5 GHz frequency band, a 6 GHz frequency band, a millimeterWave (mmWave) frequency band, e.g., a 60 GHz frequency band, a Sub-1 GHz (S1G) band, and/or any other frequency band.

In some demonstrative aspects, devices 102 and/or 140 may include or perform one or more functionalities of BT devices.

In some demonstrative aspects, devices 102 and/or 140 may include one or more BT radios including circuitry and/or logic to perform wireless communication between devices 102, 140 and/or one or more other BT devices. For example, device 102 may include at least one BT radio 114.

In some demonstrative aspects, devices 102, and/or 140 may include one or more other radios, e.g., a WiFi radio, an OFDM radio, a cellular radio, and/or the like.

In some demonstrative aspects, BT radio 114 may include one or more wireless receivers (Rx) including circuitry and/or logic to receive wireless communication signals, RF signals, frames, blocks, transmission streams, packets, messages, data items, and/or data. For example, BT radio 114 may include at least one receiver 116.

In some demonstrative aspects, BT radio 114 may include one or more wireless transmitters (Tx) including circuitry and/or logic to transmit wireless communication signals, RF signals, frames, blocks, transmission streams, packets, messages, data items, and/or data. For example, BT radio 114 may include at least one transmitter 118.

In some demonstrative aspects, BT radio 114, transmitter 118, and/or receiver 116, may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like.

In some demonstrative aspects, BT radio 114 may be configured to communicate over a 2.4 GHz band and/or any other band.

In some demonstrative aspects, BT radio 114 may include, or may be associated with, one or more antennas. For example, BT radio 114 may include, or may be associated with, one or more antennas 107.

In one example, device 102 may include a single antenna 107. In another example, device 102 may include two or more antennas 107.

In some demonstrative aspects, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. In some aspects, antennas 107 and/or 147 may implement transmit and receive functionalities using separate transmit and receive antenna elements. In some aspects, antennas 107 and/or 147 may implement transmit and receive functionalities using common and/or integrated transmit/receive elements.

In some demonstrative aspects, device 102 may include a controller 124 configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative aspects, controller 124 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controller 124. Additionally or alternatively, one or more functionalities of controller 124 may be implemented by logic, which may be executed by a machine and/or one or more processors, e.g., as described below.

In one example, controller 124 may include circuitry and/or logic, for example, one or more processors including circuitry and/or logic, to cause, trigger and/or control device 102 to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative aspects, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative aspects, message processor 128 may include circuitry and/or logic, e.g., processor circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processor 128. Additionally or alternatively, one or more functionalities of message processor 128 may be implemented by logic, which may be executed by a machine and/or one or more processors, e.g., as described below.

In some demonstrative aspects, at least part of the functionality of message processor 128 may be implemented as part of controller 124.

In other aspects, the functionality of message processor 128 may be implemented as part of any other element of device 102.

In some demonstrative aspects, at least part of the functionality of controller 124, message processor 128 and/or BT radio 114 may be implemented by an integrated circuit, for example, a chip, e.g., a System on Chip (SoC). In one example, the chip or SoC may be configured to perform one or more functionalities of BT radio 114. For example, the chip or SoC may include one or more elements of BT radio 114, one or more elements of controller 124, one or more elements of message processor 128. In one example, BT radio 114, controller 124, and message processor 128 may be implemented as part of the chip or SoC.

In other aspects, controller 124, message processor 128, and/or BT radio 114 may be implemented by one or more additional or alternative elements of device 102.

In some demonstrative aspects, wireless communication devices 102 and/or 140 may form, or may communicate as part of, a wireless local area network (WLAN).

In some demonstrative aspects, wireless communication devices 102 and/or 140 may form, or may communicate as part of, a BT network.

In some demonstrative aspects, wireless communication devices 102 and/or 140 may form, or may communicate as part of, a WiFi network.

In other aspects, wireless communication devices 102 and/or 140 may form, and/or communicate as part of, any other additional or alternative network.

In some demonstrative aspects, devices 102 and/or 140 may include BT devices, e.g., as described below.

In one example, devices 102 and/or 140 may include BT Low Energy (LE) (BLE) compatible devices.

In some demonstrative aspects, device 102 may include, operate as, perform a role of, and/or perform one or more functionalities of, an audio source device, and/or device 140 may include, operate as, perform a role of, and/or perform one or more functionalities of, an audio sink device, e.g., as described below.

In some demonstrative aspects, the audio source device, e.g., device 102, may be configured to provide audio data, in the form of one or more audio streams, to one or more audio destination (sink) devices.

In some demonstrative aspects, the audio source device, e.g., device 102, may be configured to provide the one or more audio streams based on local audio data, e.g., locally stored by the audio source device and/or locally retrieved from a storage device.

In some demonstrative aspects, the audio source device, e.g., device 102, may be configured to provide the one or more audio streams based on remote audio data, e.g., received from a remote location or server.

In one example, device 102 may include an audio source device of a home theater system, and/or device 140 may include an audio sink device of the home theater system, e.g., a speaker device, a headset device or any other audio sink.

In another example, device 102 may include a computing device, e.g., a laptop computer, a Smartphone, a UE, or any other device which may operate as an audio source device to provide one or more audio streams to one or more audio sinks, e.g., device 140. For example, device 140 may include a speaker device, a BT speaker, a headset, a BT headset, or any other audio device.

In other aspects, devices 102 and/or 140 may be configured to perform any other additional or alternative functionalities.

In some demonstrative aspects, device 140 may include a speaker, e.g., a BT speaker, configured to be paired with an audio source device, e.g., device 102.

In some demonstrative aspects, device 102 may be configured to transmit an audio stream to device 140, e.g., as described below.

In some demonstrative aspects, device 102 and/or device 140 may be implemented as part of an audio system, e.g., system 100, which may be configured to include an audio source device, e.g., device 102, configured as a "central" audio source to send an audio stream to a plurality of audio sink devices, e.g., including device 140.

In one example, system 100 may be implemented as part of a home theater system. For example, device 102 may be configured as a central audio source to send an audio stream to a plurality of speaker devices, e.g., where device 140 may be one of the speaker devices.

In some use cases, scenarios and/or implementations, it may not be suitable to use a wired protocol to connect between the audio source device and the audio sink devices. For example, the wired protocol may result in a deployment, which may not be aesthetic. For example, the use of wires to connect between the audio source device and the audio sink devices may make a system, e.g., a home theater system, appear to be full of wires spread out, e.g., on a roof, and/or walls. In contrast, wireless streaming protocols may provide an aesthetic solution. However, when implementing wireless streaming protocols there may be a need to address one or more technical aspects, for example, available air bandwidth, a requirement for high quality delivery, power requirements, and the like.

In some use cases, it may be challenging to deploy an audio system, e.g., a home theater system, in a manner, which may support high quality wireless audio streaming.

In some demonstrative aspects, in some use cases, scenarios and/or implementations there may be a need to address one or more technical issues when implementing a BT wireless communication link to communicate one or more audio streams, e.g., between a BT audio source device and one or more BT audio sink devices.

For example, there may be a wide range of encoding/decoding (codec) schemes, e.g., including proprietary codec schemes, which may be available for wireless audio streaming, for example, Bluetooth wireless audio streaming.

For example, a stream setup operation may be performed between an audio source device and an audio sink device to setup an audio stream according to a particular codec scheme, for example, to support audio stream transmission over a Bluetooth link between the audio source device and the audio sink device.

For example, various audio streaming codec schemes may be configured with respect to various use cases and/or implementations. In one example, some codec schemes may be configured to provide audio streaming with a relatively high audio quality, for example, at the cost of a higher wireless communication bandwidth. In another example, some codec schemes may be configured to utilize a relatively low wireless communication bandwidth, at the cost of supporting a relatively audio quality.

In one example, an LDAC codec may be configured to support audio streaming with high quality audio. For example, the LDAC codec may require a bandwidth of about 990 kilo-bites per second (kbps).

In another example, an APTX codec may be configured to support audio streaming with high quality audio. For example, the APTX codec may require a bandwidth of about 600 kbps.

In another example, a Sub-Band-Coding (SBC) codec may be configured to support audio streaming with medium quality audio, e.g., lower than the audio quality of the LDPC and/or APTX codecs. For example, the SBC codec may require a bandwidth of about 345 kbps. In some implementations and/or systems, the SBC codec may be implemented as a mandatory codec.

In another example, Advanced Audio Coding (AAC) codec may be configured to support audio streaming with medium quality audio, e.g., lower than the audio quality of the LDPC and/or APTX codecs. For example, the AAC codec may require a bandwidth of about 2565 kbps.

In other aspects, any other additional or alternative codecs may be used.

In some use cases, there may be a need to provide a technical solution to meet data rate requirements of a codec, for example, in noisy environments, and/or when there is more than one Bluetooth link connected to the same device. For example, in case there is not enough capacity to support a required data rate for a codec, the quality of a coded audio stream, which is using a high quality codec, may be poorer than the quality of a coded audio stream, which is using a medium quality codec. This degraded quality of the audio stream may result in a degradation in user experience.

In some demonstrative aspects, for example, in some use cases, scenarios, and/or implementations, there may be one or more technical issues in utilizing a same fixed codec configuration for audio streaming over a wireless link.

In one example, it may be disadvantageous to configure BT audio devices to establish a wireless audio streaming channel using a fixed high quality codec, e.g., an LDAC codec, or an APTX codec. For example, the wireless audio streaming channel using the fixed high quality codec may suffer from poor audio quality, for example, in cases where a high throughput wireless link cannot be supported.

In another example, it may be disadvantageous to configure BT audio devices to establish a wireless audio streaming channel using a fixed medium quality codec, e.g., an SBC codec, or an AAC codec. For example, the wireless audio streaming channel using the fixed medium quality codec may be limited to the medium audio quality and not be able to utilize a high throughput wireless link to provide higher audio quality.

In some demonstrative aspects, for example, in some use cases, scenarios, and/or implementations, there may be one or more technical issues in a solution using a single fixed codec scheme with variable bit rate, for example, an APTX variable bit rate codec. For example, this solution may have a limited range of bit rate difference.

In some demonstrative aspects, device 102 may be configured to setup with device 140 a BT wireless communication link 126 to communicate an audio stream from device 102 to device 140, e.g., as described below.

In some demonstrative aspects, devices 102 and/or 140 may be configured to dynamically switch between a plurality of codec schemes for streaming audio over BT wireless communication link 126 between device 102 and device 140, e.g., as described below.

In some demonstrative aspects, devices 102 and/or 140 may be configured to dynamically switch between the plurality of codec schemes for streaming audio over BT wireless communication link 126, for example, based on a condition of the BT wireless communication link 126, e.g., as described below.

In some demonstrative aspects, devices 102 and/or 140 may be configured to dynamically switch between the plurality of codec schemes, for example, based on a link quality and/or an environment of the BT wireless communication link 126, e.g., as described below.

In some demonstrative aspects, dynamically switching between the plurality of codec schemes may provide, for example, an advantage of improved user experience, e.g., as described below.

In some demonstrative aspects, device 102 may be configured to seamlessly identify and switch between an audio codec of high quality, which may utilize, for example, a high bandwidth (BW), and an audio codec of medium quality, which may utilize, for example, a low BW, e.g., as described below.

In some demonstrative aspects, device 102 may be configured to seamlessly identify and switch between audio codecs of different quality, for example, based on the link quality of BT wireless communication link 126, and/or the environment of BT wireless communication link 126, e.g., as described below.

In some demonstrative aspects, controller 124 may be configured to control, cause, trigger and/or instruct, an audio source device implemented by device 102, to transmit an audio stream to an audio sink device implemented by device 140, over BT wireless communication link 126, e.g., as described below.

In some demonstrative aspects, the audio stream may be configured, for example, according to a first Advanced Audio Distribution Profile (A2DP) codec scheme, e.g., as described below. For example, controller 124 may be configured to setup, negotiate, and/or configure the first A2DP codec scheme, e.g., with device 140.

In some demonstrative aspects, controller 124 may be configured to control, cause, trigger and/or instruct device 102 to monitor a link-condition parameter corresponding to a link condition of BT wireless communication link 126, e.g., as described below.

In some demonstrative aspects, the link-condition parameter may include at least one channel assessment parameter, for example, corresponding to a channel state of BT wireless communication link 126.

In some demonstrative aspects, the link-condition parameter may include a retransmission parameter, for example, based on a count of retransmissions over BT wireless communication link 126.

In other aspects, the link-condition parameter may include any other additional or alternative parameter relating to a condition of BT wireless communication link 126.

In some demonstrative aspects, controller 124 may be configured to control, cause, trigger and/or instruct device 102 to reconfigure the audio stream, for example, based on the link-condition parameter, e.g., as described below.

In some demonstrative aspects, controller 124 may be configured to control, cause, trigger and/or instruct device 102 to reconfigure the audio stream, for example, according to a second A2DP codec scheme, e.g., as described below.

In some demonstrative aspects, controller 124 may be configured to control, cause, trigger and/or instruct device 102 to generate the audio stream configured according to the first A2DP codec scheme, for example, by encoding audio data according to the first A2DP codec scheme.

In some demonstrative aspects, controller 124 may be configured to control, cause, trigger and/or instruct device 102 to reconfigure the audio stream according to the second A2DP codec scheme, for example, by encoding the audio data according to the second A2DP codec scheme.

In some demonstrative aspects, controller 124 may be configured to control, cause, trigger and/or instruct device 102 to reconfigure the audio stream according to the second A2DP codec scheme, for example, based on a change in the link-condition parameter representing a change in a throughput of BT wireless communication link 126, e.g., as described below.

In some demonstrative aspects, controller 124 may be configured to control, cause, trigger and/or instruct device 102 to reconfigure the audio stream according to the second A2DP codec scheme, for example, based on a determination that the link-condition parameter crosses a link-condition threshold, e.g., as described below.

In some demonstrative aspects, the first A2DP codec may be configured for audio streaming at a first quality level with a first throughput requirement, and the second A2DP codec may be configured for audio streaming at a second quality level with a second throughput requirement, e.g., as described below.

In some demonstrative aspects, the first quality level may be higher than the second quality level, e.g., as described below.

In some demonstrative aspects, the first throughput requirement may be higher than the second throughput requirement, e.g., as described below.

In some demonstrative aspects, controller 124 may be configured to control, cause, trigger and/or instruct device 102 to reconfigure the audio stream according to the second A2DP codec scheme, for example, based on a change in the link-condition parameter representing a degradation of a throughput of BT wireless communication link 126, for example, below the first throughput requirement, e.g., as described below.

In one example, controller 124 may cause device 102 to configure the audio stream according to an audio codec of high quality, e.g., the LDAC codec, the APTX codec, and/or any other codec, for example, when the link-condition parameter indicates that BT wireless communication link 126 supports high throughput.

In another example, controller 124 may be configured to cause device 102 to reconfigure the audio stream according to an audio codec of medium quality, for example, the SBC codec, the ADC codec, and/or any other codec, for example, when the link-condition parameter indicates a degradation of the throughput supported BT wireless communication link 126, for example, to a level below the link-condition threshold.

In some demonstrative aspects, controller 124 may be configured to control, cause, trigger and/or instruct device 102 to reconfigure the audio stream according to the first A2DP codec scheme, for example, subsequent to reconfiguring the audio stream according to the second A2DP codec scheme, e.g., as described below.

In some demonstrative aspects, controller 124 may be configured to control, cause, trigger and/or instruct device 102 to reconfigure the audio stream according to the first A2DP codec scheme, for example, based on a change in the link-condition parameter representing an improvement of the throughput of BT wireless communication link 126, for example, above the first throughput requirement.

In some demonstrative aspects, controller 124 may be configured to control, cause, trigger and/or instruct device 102 to open a Stream End Point (SEP) for communication with device 140, for example, according to the first A2DP codec scheme, e.g., as described below.

In some demonstrative aspects, controller 124 may be configured to control, cause, trigger and/or instruct device 102 to operate the SEP, for example, to transmit the audio stream configured according to the first A2DP codec scheme, e.g., as described below.

In some demonstrative aspects, controller 124 may be configured to control, cause, trigger and/or instruct device 102 to reconfigure the SEP for communication with device 140, for example, based on the link-condition parameter, e.g., as described below.

In some demonstrative aspects, controller 124 may be configured to control, cause, trigger and/or instruct device 102 to reconfigure the SEP for communication with device 140, for example, according to the second A2DP codec scheme, e.g., as described below.

In some demonstrative aspects, controller 124 may be configured to control, cause, trigger and/or instruct device 102 to operate the SEP to transmit the audio stream configured according to the second A2DP codec scheme, e.g., as described below.

Figure 2:
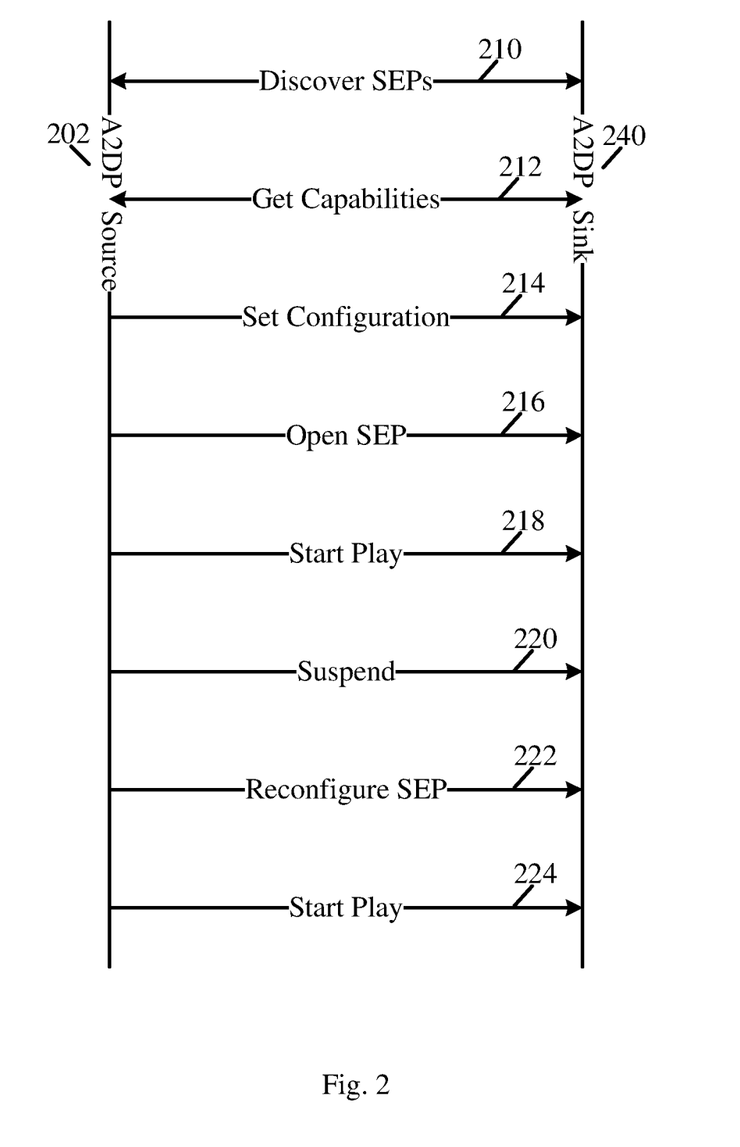
FIG. 2 is a schematic illustration of a sequence of communications between an audio source device and an audio sink device, in accordance with some demonstrative aspects.

Reference is made to FIG. 2, which schematically illustrates a sequence of communications between an A2DP source device 202 and an A2DP sink device 240, in accordance with some demonstrative aspects.

For example, device 102 (FIG. 1) may perform one or more operations of, the functionality of, and/or the role of, A2DP source device 202, and/or device 140 (FIG. 1) may perform one or more operations of, the functionality of, and/or the role of, A2DP sink device 240.

In some demonstrative aspects, as indicated by arrow 210, A2DP source device 202 and A2DP sink device 240 may be configured to perform a SEP discovery operation, for example, to allow A2DP source device 202 to discover one or more SEPs of A2DP sink device 240, for example, according to an A2DP setup and/or negotiation protocol.

In some demonstrative aspects, as indicated by arrow 212, A2DP source device 202 and A2DP sink device 240 may be configured to exchange capability information, for example, according to the A2DP setup and/or negotiation protocol.

For example, A2DP source device 202 may receive from A2DP sink device 240 one or more messages to indicate one or more capabilities of A2DP sink device 240, and/or A2DP sink device 240 may receive from A2DP source device 202 one or more messages to indicate one or more capabilities of A2DP source device 202.

In some demonstrative aspects, as indicated by arrow 214, A2DP source device 202 may be configured to set a configuration of an audio stream to be transmitted from A2DP source device 202 to A2DP sink device 240 according to a first A2DP codec scheme.

In some demonstrative aspects, first A2DP codec scheme may be set up, configured and/or negotiated between A2DP source device 202 and A2DP sink device 240, for example, based on the capability exchange 212, and/or based on any other criteria and/or input.

In some demonstrative aspects, as indicated by arrow 216, A2DP source device 202 may be configured to open a SEP for transmitting an audio stream to A2DP sink device 240. For example, A2DP source device 202 may configure the SEP according to the first A2DP codec scheme.

In some demonstrative aspects, as indicated by arrow 218, A2DP source device 202 may be configured to operate the SEP to transmit the audio stream configured according to the first A2DP codec scheme, for example, over a BT wireless communication link between A2DP source device 202 and A2DP sink device 240.

In some demonstrative aspects, A2DP source device 202 may be configured to monitor a link-condition parameter corresponding to a link condition of the BT wireless communication link between A2DP source device 202 and A2DP sink device 240.

In some demonstrative aspects, A2DP source device 202 may be configured to switch from the first A2DP codec scheme to a second A2DP codec scheme, for example, based on the link-condition parameter, e.g., as described below.

In some demonstrative aspects, as indicated by arrow 220, A2DP source device 202 may be configured to suspend transmission of the audio stream according to the first A2DP codec scheme, for example, based on the link-condition parameter.

For example, A2DP source device 202 may be configured to suspend transmission of the audio stream according to the first A2DP codec scheme, for example, based on identifying a degradation in the quality of a BT wireless communication link.

For example, A2DP source device 202 may suspend transmission of the audio stream according to the first A2DP codec scheme, based on identifying that the quality of the BT wireless communication link decreases below a link-condition threshold.

In one example, the link-condition threshold may correspond to a throughput threshold required to support the first A2DP codec scheme. For example, if the first A2DP codec scheme is configured for a high quality audio, then the link-condition threshold may correspond to a throughput threshold required to support the high quality audio. In one example, the link-condition threshold may correspond to a throughput of 990 kbs, e.g., to support an LDAC codec. In another example, the link-condition threshold may correspond to a throughput of 660 kbs, e.g., to support an APTX codec.

In some demonstrative aspects, as indicated by arrow 222, A2DP source device 202 may be configured to reconfigure the SEP for communication with A2DP sink device 340, for example, according to the second A2DP codec scheme.

In some demonstrative aspects, as indicated by arrow 224, A2DP source device 202 may be configured to operate the SEP to transmit the audio stream configured according to the second A2DP codec scheme.

In some use cases, scenarios, and/or implementations, the operations of suspending the transmission of the audio stream according to the first A2DP codec scheme (220) and/or reconfiguring the SEP according to the second A2DP codec scheme (222), may result in an audio blip in the audio stream to be received by A2DP sink device 240.

Referring back to FIG. 1, in some demonstrative aspects, device 102 may be configured to utilize a hand-off procedure to support reconfiguration of the SEP according to the second A2DP codec, for example, while avoiding a possibility of the audio blip, e.g., as described below.

In some demonstrative aspects, controller 124 may be configured to control, cause, trigger and/or instruct device 102 to open a first SEP for communication with device 140, for example, according to the first A2DP codec scheme, e.g., as described below.

In some demonstrative aspects, controller 124 may be configured to control, cause, trigger and/or instruct device 102 to open a second SEP for communication with device 140, for example, according to the second A2DP codec scheme, e.g., as described below.

In some demonstrative aspects, controller 124 may be configured to control, cause, trigger and/or instruct device 102 to operate the first SEP to transmit the audio stream configured according to the first A2DP codec scheme, e.g., as described below.

In some demonstrative aspects, controller 124 may be configured to control, cause, trigger and/or instruct device 102 to suspend the first SEP, for example, based on the link-condition parameter, e.g., as described below.

In some demonstrative aspects, controller 124 may be configured to control, cause, trigger and/or instruct device 102 to operate the second SEP to transmit the audio stream configured according to the second A2DP codec scheme, e.g., as described below.

Figure 3:
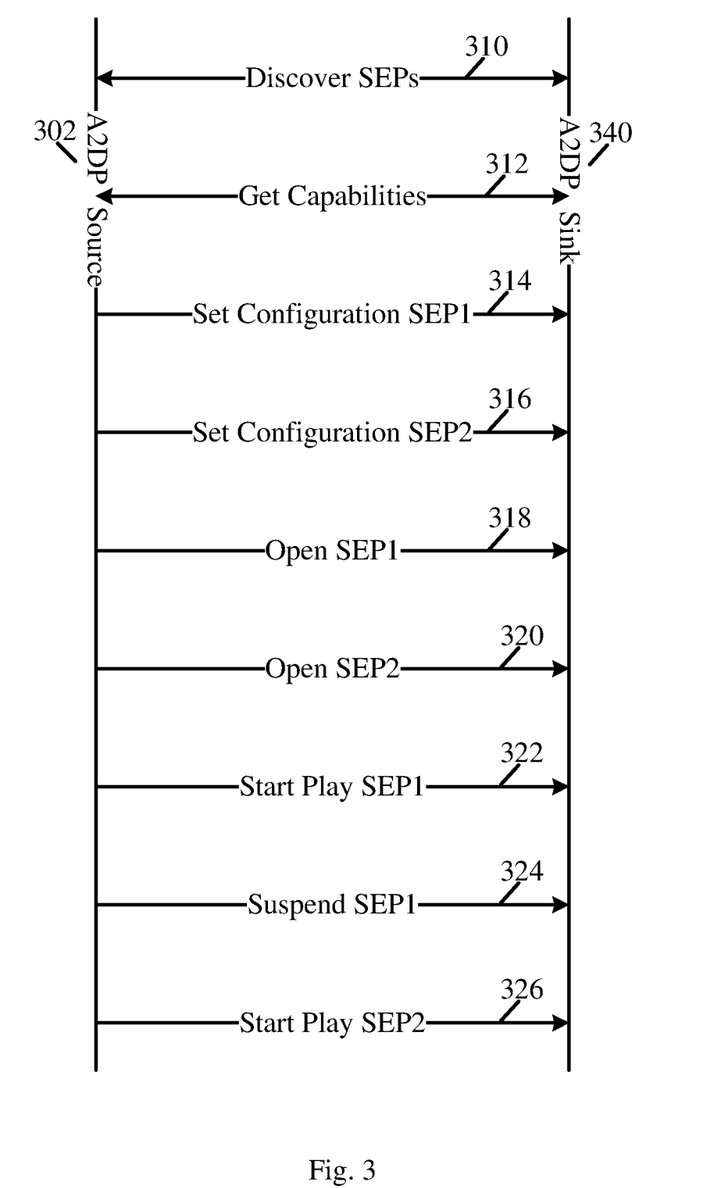
FIG. 3 is a schematic illustration of a sequence of communications between an audio source device and an audio sink device, in accordance with some demonstrative aspects.

Reference is made to FIG. 3, which schematically illustrates a sequence of communications between an A2DP source device 302 and an A2DP sink device 340, in accordance with some demonstrative aspects.

For example, device 102 (FIG. 1) may perform one or more operations of, the functionality of, and/or the role of, A2DP source device 302, and/or device 140 (FIG. 1) may perform one or more operations of, the functionality of, and/or the role of, A2DP sink device 340.

In some demonstrative aspects, as indicated by arrow 310, A2DP source device 302 and A2DP sink device 340 may be configured to perform a SEP discovery operation, for example, to allow A2DP source device 302 to discover one or more SEPs of A2DP sink device 340, for example, according to an A2DP setup and/or negotiation protocol.

In some demonstrative aspects, as indicated by arrow 312, A2DP source device 302 and A2DP sink device 340 may be configured to exchange capability information, for example, according to the A2DP setup and/or negotiation protocol.

For example, A2DP source device 302 may receive from A2DP sink device 340 one or more messages to indicate one or more capabilities of A2DP sink device 340, and/or A2DP sink device 340 may receive from A2DP source device 302 one or more messages to indicate one or more capabilities of A2DP source device 302.

In some demonstrative aspects, as indicated by arrow 314, A2DP source device 302 may be configured to set a configuration of a first SEP (SEP1) according to a first A2DP codec scheme.

In some demonstrative aspects, the first SEP may be set up, configured and/or negotiated between A2DP source device 302 and A2DP sink device 340, for example, based on the capability exchange 312, and/or based on any other criteria and/or input.

In some demonstrative aspects, as indicated by arrow 316, A2DP source device 302 may be configured to set a configuration of a second SEP (SEP 2) according to a second A2DP codec scheme, e.g., different from the first A2DP codec scheme.

In some demonstrative aspects, the second SEP may be set up, configured and/or negotiated between A2DP source device 302 and A2DP sink device 340, for example, based on the capability exchange 312, and/or based on any other criteria and/or input.

In some demonstrative aspects, as indicated by arrow 318, A2DP source device 302 may be configured to open the first SEP for communication with A2DP sink device 340.

In some demonstrative aspects, as indicated by arrow 320, A2DP source device 302 may be configured to open the second SEP for communication with A2DP sink device 340.

In some demonstrative aspects, as shown in FIG. 3, A2DP source device 302 may be configured to maintain both the SEP1 and the SEP2 open, e.g., in parallel. For example, maintaining both the SEP1 and the SEP2 open, e.g., in parallel, may support an efficient hand-off of the handling of the audio stream from the SEP1 to the SEP 2, e.g., as described below.

In some demonstrative aspects, as indicated by arrow 322, A2DP source device 302 may be configured to operate the first SEP to transmit the audio stream configured according to the first A2DP codec scheme, for example, over a BT wireless communication link between A2DP source device 302 and A2DP sink device 340.

In some demonstrative aspects, A2DP source device 302 may be configured to monitor a link-condition parameter corresponding to a link condition of the BT wireless communication link between A2DP source device 302 and A2DP sink device 340.

In some demonstrative aspects, A2DP source device 302 may be configured to switch from the first A2DP codec scheme to the second A2DP codec scheme, for example, based on the link-condition parameter, e.g., as described below.

In some demonstrative aspects, A2DP source device 302 may be configured to switch from the first A2DP codec scheme to the second A2DP codec scheme, for example, according to a hand-off procedure, which may support an efficient, e.g., a seamless, hand-off from the first SEP to the second Sep, e.g., as described below.

In some demonstrative aspects, as indicated by arrow 324, A2DP source device 202 may be configured to suspend the first SEP, for example, based on the link-condition parameter.

For example, A2DP source device 302 may be configured to suspend transmission of the audio stream according to the first A2DP codec scheme, for example, based on identifying a degradation in the quality of the BT wireless communication link between A2DP source device 302 and A2DP sink device 340.

For example, A2DP source device 302 may suspend transmission of the audio stream according to the first A2DP codec scheme, for example, based on identifying that the quality of the BT wireless communication link decreases below a link-condition threshold.

In one example, the link-condition threshold may correspond to a throughput threshold required to support the first A2DP codec scheme. For example, if the first A2DP codec scheme is configured for a high quality audio, then the link-condition threshold may correspond to a throughput threshold required to support the high quality audio. In one example, the link-condition threshold may correspond to a throughput of 990 kbs, e.g., to support an LDAC codec. In another example, the link-condition threshold may correspond to a throughput of 660 kbs, e.g., to support an APTX codec.

In some demonstrative aspects, as indicated by arrow 326, A2DP source device 302 may be configured to operate the second SEP to transmit the audio stream according to the second A2DP codec scheme, for example, over the BT wireless communication link between A2DP source device 302 and A2DP sink device 340.

In some demonstrative aspects, A2DP source device 302 may be configured to switch back to the first A2DP codec scheme, for example, based on identifying that the link-condition of the BT wireless communication link increases above the link-condition threshold.

In some demonstrative aspects, for example, in some use cases, scenarios, and/or implementations, the hand-off procedure for handing over the communication from the first SEP to the second SEP may be implemented to support switching from communicating the audio stream configured according to the first A2DP codec to communicating the audio stream configured according to the second A2DP codec scheme, for example, with a reduced delay or even with substantially no delay. Accordingly, implementation of the hand-off procedure may provide a technical solution to support an improved user experience.

Figure 4:
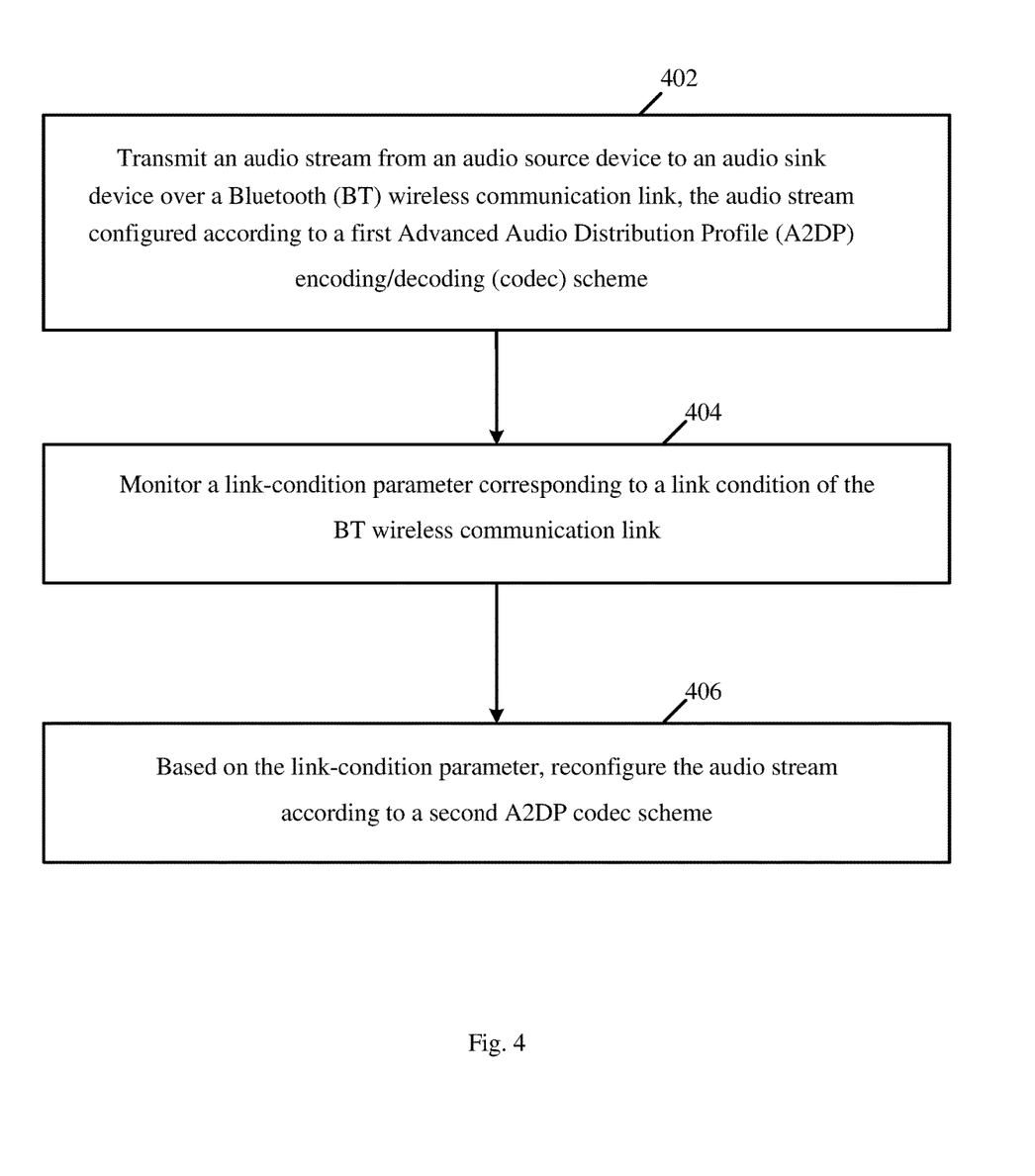
FIG. 4 is a schematic flow-chart illustration of a method of communicating audio traffic over a Bluetooth link, in accordance with some demonstrative aspects.

Reference is made to FIG. 4, which schematically illustrates a method of communicating audio traffic over a Bluetooth link, in accordance with some demonstrative aspects. For example, one or more of the operations of the method of FIG. 4 may be performed by one or more elements of a system, e.g., system 100 (FIG. 1), for example, one or more wireless devices, e.g., device 102 (FIG. 1) and/or device 140 (FIG. 1), a BT radio, e.g., radio 114 (FIG. 1), a receiver, e.g., receiver 116 (FIG. 1), a controller, e.g., controller 124 (FIG. 1), and/or a message processor, e.g., message processor 128 (FIG. 1).

As indicated at block 402, the method may include transmitting an audio stream from an audio source device to an audio sink device over a BT wireless communication link, the audio stream configured according to a first A2DP codec scheme. For example, controller 124 (FIG. 1) may be configured to control, cause, trigger and/or instruct device 102 (FIG. 1) to transmit the audio stream configured according to the first A2DP codec scheme to device 140 (FIG. 1), e.g., as described above.

As indicated at block 404, the method may include monitoring a link-condition parameter corresponding to a link condition of the BT wireless communication link. For example, controller 124 (FIG. 1) may be configured to control, cause, trigger and/or instruct device 102 (FIG. 1) to monitor the link-condition parameter corresponding to the link condition of the BT wireless communication link between device 102 (FIG. 1) and device 140 (FIG. 1), e.g., as described above.

As indicated at block 406, the method may include, reconfiguring the audio stream according to a second A2DP codec scheme, for example, based on the link-condition parameter. For example, controller 124 (FIG. 1) may be configured to control, cause, trigger and/or instruct device 102 (FIG. 1) to reconfigure the audio stream according to the second A2DP codec scheme, for example, based on the link-condition parameter, e.g., as described above.

Figure 5:
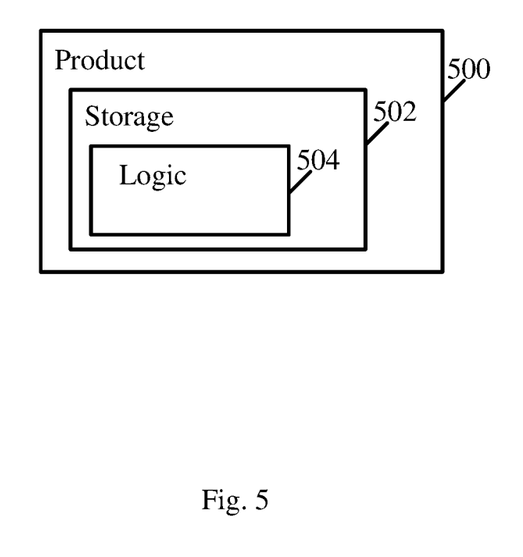
FIG. 5 is a schematic illustration of a product of manufacture, in accordance with some demonstrative aspects.

Reference is made to FIG. 5, which schematically illustrates a product of manufacture 500, in accordance with some demonstrative aspects. Product 500 may include one or more tangible computer-readable ("machine-readable") non-transitory storage media 502, which may include computer-executable instructions, e.g., implemented by logic 504, operable to, when executed by at least one computer processor, enable the at least one computer processor to implement one or more operations at device 102 (FIG. 1), device 140 (FIG. 1), BT radio 114 (FIG. 1), controller 124 (FIG. 1), receiver 116 (FIG. 1), transmitter 118 (FIG. 1), and/or message processor 128 (FIG. 1); to cause device 102 (FIG. 1), device 140 (FIG. 1), BT radio 114 (FIG. 1), controller 124 (FIG. 1), receiver 116 (FIG. 1), transmitter 118 (FIG. 1), and/or message processor 128 (FIG. 1) to perform, trigger and/or implement one or more operations and/or functionalities; and/or to perform, trigger and/or implement one or more operations and/or functionalities described with reference to the FIGS. 1, 2, 3, and/or 4, and/or one or more operations described herein. The phrases "non-transitory machine-readable medium" and "computer-readable non-transitory storage media" may be directed to include all computer-readable media, with the sole exception being a transitory propagating signal.

In some demonstrative aspects, product 500 and/or machine-readable storage media 502 may include one or more types of computer-readable storage media capable of storing data, including volatile memory, non-volatile memory, removable or non-removable memory, erasable or non-erasable memory, writeable or rewriteable memory, and the like. For example, machine-readable storage media 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Examples

The following examples pertain to further aspects.

Example 1 includes an apparatus comprising logic and circuitry configured to cause an audio source device to transmit an audio stream to an audio sink device over a Bluetooth (BT) wireless communication link, the audio stream configured according to a first Advanced Audio Distribution Profile (A2DP) encoding/decoding (codec) scheme; monitor a link-condition parameter corresponding to a link condition of the BT wireless communication link; and based on the link-condition parameter, reconfigure the audio stream according to a second A2DP codec scheme.

Example 2 includes the subject matter of Example 1, and optionally, wherein the apparatus is configured to cause the audio source device to open a first Stream End Point (SEP) for communication with the audio sink device according to the first A2DP codec scheme; open a second SEP for communication with the audio sink device according to the second A2DP codec scheme; operate the first SEP to transmit the audio stream configured according to the first A2DP codec scheme; and based on the link-condition parameter, suspend the first SEP, and operate the second SEP to transmit the audio stream configured according to the second A2DP codec scheme.

Example 3 includes the subject matter of Example 1, and optionally, wherein the apparatus is configured to cause the audio source device to open a Stream End Point (SEP) for communication with the audio sink device according to the first A2DP codec scheme; operate the SEP to transmit the audio stream configured according to the first A2DP codec scheme; and based on the link-condition parameter, reconfigure the SEP for communication with the audio sink device according to the second A2DP codec scheme, and operate the SEP to transmit the audio stream configured according to the second A2DP codec scheme.

Example 4 includes the subject matter of any one of Examples 1-3, and optionally, wherein the apparatus is configured to cause the audio source device to reconfigure the audio stream according to the second A2DP codec scheme based on a change in the link-condition parameter representing a change in a throughput of the BT wireless communication link.

Example 5 includes the subject matter of any one of Examples 1-4, and optionally, wherein the apparatus is configured to cause the audio source device to reconfigure the audio stream according to the second A2DP codec scheme based on a determination that the link-condition parameter crosses a link-condition threshold.

Example 6 includes the subject matter of any one of Examples 1-5, and optionally, wherein the first A2DP codec is configured for audio streaming at a first quality level with a first throughput requirement, and the second A2DP codec is configured for audio streaming at a second quality level with a second throughput requirement, the first quality level is higher than the second quality level, the first throughput requirement is higher than the second throughput requirement.

Example 7 includes the subject matter of Example 6, and optionally, wherein the apparatus is configured to cause the audio source device to reconfigure the audio stream according to the second A2DP codec scheme based on a change in the link-condition parameter representing a degradation of a throughput of the BT wireless communication link below the first throughput requirement.

Example 8 includes the subject matter of Example 7, and optionally, wherein the apparatus is configured to cause the audio source device to, subsequent to reconfiguring the audio stream according to the second A2DP codec scheme, reconfigure the audio stream according to the first A2DP codec scheme based on a change in the link-condition parameter representing an improvement of a throughput of the BT wireless communication link above the first throughput requirement.

Example 9 includes the subject matter of any one of Examples 1-8, and optionally, wherein the link-condition parameter comprises at least one channel assessment parameter corresponding to a channel state of the BT wireless communication link.

Example 10 includes the subject matter of any one of Examples 1-9, and optionally, wherein the link-condition parameter comprises a retransmission parameter based on a count of retransmissions over the BT wireless communication link.

Example 11 includes the subject matter of any one of Examples 1-10, and optionally, wherein the apparatus is configured to cause the audio source device to generate the audio stream configured according to the first A2DP codec scheme by encoding audio data according to the first A2DP codec scheme, and to reconfigure the audio stream according to the second A2DP codec scheme by encoding the audio data according to the second A2DP codec scheme.

Example 12 includes the subject matter of any one of Examples 1-11, and optionally, comprising a radio to transmit the audio stream over the BT wireless communication link.

Example 13 includes the subject matter of Example 12, and optionally, comprising one or more antennas connected to the radio, and a processor to execute instructions of an operating system of the audio source device.

Example 14 comprises an apparatus comprising means for executing any of the described operations of Examples 1-13.

Example 15 comprises a product comprising one or more tangible computer-readable non-transitory storage media comprising computer-executable instructions operable to, when executed by at least one processor, enable the at least one processor to cause a computing device to perform any of the described operations of Examples 1-13.

Example 16 comprises an apparatus comprising: a memory interface; and processing circuitry configured to: perform any of the described operations of Examples 1-13.

Example 17 comprises a method comprising any of the described operations of Examples 1-13.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause an audio source device to:
open a first Stream End Point (SEP) for communication with an audio sink device according to a first Advanced Audio Distribution Profile (A2DP) encoding/decoding (codec) scheme;
open a second SEP for communication with the audio sink device according to a second A2DP codec scheme;
operate the first SEP to transmit an audio stream over a Bluetooth (BT) wireless communication link, the audio stream configured according to the first A2DP codec scheme;
monitor a link-condition parameter corresponding to a link condition of the BT wireless communication link; and
based on the link-condition parameter, suspend the first SEP, and operate the second SEP to transmit the audio stream configured according to the second A2DP codec scheme.

2. The apparatus of claim 1 configured to cause the audio source device to reconfigure the audio stream according to the second A2DP codec scheme based on a change in the link-condition parameter representing a change in a throughput of the BT wireless communication link.

3. The apparatus of claim 1 configured to cause the audio source device to reconfigure the audio stream according to the second A2DP codec scheme based on a determination that the link-condition parameter crosses a link-condition threshold.

4. The apparatus of claim 1, wherein the first A2DP codec scheme is configured for audio streaming at a first quality level with a first throughput requirement, and the second A2DP codec scheme is configured for audio streaming at a second quality level with a second throughput requirement, the first quality level is higher than the second quality level, the first throughput requirement is higher than the second throughput requirement.

5. The apparatus of claim 4 configured to cause the audio source device to reconfigure the audio stream according to the second A2DP codec scheme based on a change in the link-condition parameter representing a degradation of a throughput of the BT wireless communication link below the first throughput requirement.

6. The apparatus of claim 5 configured to cause the audio source device to, subsequent to reconfiguring the audio stream according to the second A2DP codec scheme, reconfigure the audio stream according to the first A2DP codec scheme based on a change in the link-condition parameter representing an improvement of a throughput of the BT wireless communication link above the first throughput requirement.

7. The apparatus of claim 1, wherein the link-condition parameter comprises at least one channel assessment parameter corresponding to a channel state of the BT wireless communication link.

8. The apparatus of claim 1, wherein the link-condition parameter comprises a retransmission parameter based on a count of retransmissions over the BT wireless communication link.

9. The apparatus of claim 1 configured to cause the audio source device to generate the audio stream configured according to the first A2DP codec scheme by encoding audio data according to the first A2DP codec scheme, and to reconfigure the audio stream according to the second A2DP codec scheme by encoding the audio data according to the second A2DP codec scheme.

10. The apparatus of claim 1 comprising a radio to transmit the audio stream over the BT wireless communication link.

11. The apparatus of claim 10 comprising one or more antennas connected to the radio, and a processor to execute instructions of an operating system of the audio source device.

12. A product comprising one or more tangible computer-readable non-transitory storage media comprising computer-executable instructions operable to, when executed by at least one processor, enable the at least one processor to cause an audio source device to:
open a Stream End Point (SEP) for communication with an audio sink device according to a first Advanced Audio Distribution Profile (A2DP) encoding/decoding (codec) scheme;
operate the SEP to transmit an audio stream over a Bluetooth (BT) wireless communication link, the audio stream configured according to the first A2DP codec scheme;
monitor a link-condition parameter corresponding to a link condition of the BT wireless communication link; and
based on the link-condition parameter, reconfigure the SEP for communication with the audio sink device according to a second A2DP codec scheme, and operate the SEP to transmit the audio stream configured according to the second A2DP codec scheme.

13. The product of claim 12, wherein the link-condition parameter comprises at least one channel assessment parameter corresponding to a channel state of the BT wireless communication link.

14. The product of claim 12, wherein the link-condition parameter comprises a retransmission parameter based on a count of retransmissions over the BT wireless communication link.

15. The product of claim 12, wherein the instructions, when executed, cause the audio source device to reconfigure the audio stream according to the second A2DP codec scheme based on a change in the link-condition parameter representing a change in a throughput of the BT wireless communication link.

16. The product of claim 12, wherein the instructions, when executed, cause the audio source device to reconfigure the audio stream according to the second A2DP codec scheme based on a determination that the link-condition parameter crosses a link-condition threshold.

17. The product of claim 12, wherein the first A2DP codec scheme is configured for audio streaming at a first quality level with a first throughput requirement, and the second A2DP codec scheme is configured for audio streaming at a second quality level with a second throughput requirement, the first quality level is higher than the second quality level, the first throughput requirement is higher than the second throughput requirement.

18. The product of claim 17, wherein the instructions, when executed, cause the audio source device to reconfigure the audio stream according to the second A2DP codec scheme based on a change in the link-condition parameter representing a degradation of a throughput of the BT wireless communication link below the first throughput requirement.

19. An audio source device comprising:
a Bluetooth (BT) radio;
one or more antennas connected to the BT radio;
a memory; and
a processor comprising logic and circuitry configured to cause the audio source device to:
transmit an audio stream over a BT wireless communication link, the audio stream configured according to a first Advanced Audio Distribution Profile (A2DP) encoding/decoding (codec) scheme, the first A2DP codec scheme configured for audio streaming at a first quality level with a first throughput requirement;
monitor a link-condition parameter corresponding to a link condition of the BT wireless communication link; and
based on a change in the link-condition parameter representing a degradation of a throughput of the BT wireless communication link below the first throughput requirement, reconfigure the audio stream according to a second A2DP codec scheme, wherein the second A2DP codec scheme is configured for audio streaming at a second quality level with a second throughput requirement, the first quality level is higher than the second quality level, the first throughput requirement is higher than the second throughput requirement.

20. The audio source device of claim 19, wherein the processor is configured to cause the audio source device to:
open a first Stream End Point (SEP) for communication with an audio sink device according to the first A2DP codec scheme;
open a second SEP for communication with the audio sink device according to the second A2DP codec scheme;
operate the first SEP to transmit the audio stream configured according to the first A2DP codec scheme; and
based on the link-condition parameter, suspend the first SEP, and operate the second SEP to transmit the audio stream configured according to the second A2DP codec scheme.

21. The audio source device of claim 19, wherein the processor is configured to cause the audio source device to:
open a Stream End Point (SEP) for communication with an audio sink device according to the first A2DP codec scheme;
operate the SEP to transmit the audio stream configured according to the first A2DP codec scheme; and
based on the link-condition parameter, reconfigure the SEP for communication with the audio sink device according to the second A2DP codec scheme, and operate the SEP to transmit the audio stream configured according to the second A2DP codec scheme.

22. The audio source device of claim 19, wherein the link-condition parameter comprises a retransmission parameter based on a count of retransmissions over the BT wireless communication link.

* * * * *